(12) United States Patent
Green

(10) Patent No.: US 7,755,304 B2
(45) Date of Patent: Jul. 13, 2010

(54) THREE-WAY DIMMING BALLAST CIRCUIT

(75) Inventor: Peter B. Green, Rancho Palos Verdes, CA (US)

(73) Assignee: International Rectifier Corporation, El Segundo, CA (US)

( * ) Notice: Subject to any disclaimer, the term of this patent is extended or adjusted under 35 U.S.C. 154(b) by 252 days.

(21) Appl. No.: 12/111,642

(22) Filed: Apr. 29, 2008

(65) Prior Publication Data

US 2008/0272709 A1 Nov. 6, 2008

Related U.S. Application Data

(60) Provisional application No. 60/927,104, filed on May 1, 2007.

(51) Int. Cl.
*H05B 37/02* (2006.01)
(52) U.S. Cl. .................. 315/308; 315/224; 315/DIG. 4
(58) Field of Classification Search ............ 315/200 R, 315/209 R, 224, 225, 226, 227 R, 246, 283, 315/288, 291, 307, 308, DIG. 4, DIG. 5, 315/DIG. 7
See application file for complete search history.

(56) References Cited

U.S. PATENT DOCUMENTS 5,719,471 A * 2/1998 Kachmarik ............. 315/209 R
5,831,395 A * 11/1998 Mortimer et al. ............ 315/307
5,866,993 A 2/1999 Moisin
6,956,336 B2 * 10/2005 Ribarich ...................... 315/247
7,109,665 B2 * 9/2006 Green ......................... 315/224

OTHER PUBLICATIONS

U.S. Appl. No. 11/551,435, filed Oct. 20, 2006 (allowed).

* cited by examiner

*Primary Examiner*—Thuy Vinh Tran
(74) *Attorney, Agent, or Firm*—Farjami & Farjami LLP

(57) ABSTRACT

A three-way dimming ballast circuit for driving a ballast power switching circuit powering a gas discharge lamp such as a CFL. The circuit includes a driver circuit for driving high and low side switches of the ballast power switching circuit; a control circuit for driving the driver circuit including an oscillator circuit for providing an oscillating signal to control the frequency of operation of the ballast power switching circuit, the ballast power switching circuit outputting lamp-powering pulsed signals; and a dimming control circuit having an input, the dimming control circuit receiving an AC lamp current feedback signal at the input, the dimming control circuit further receiving a DC input voltage reference at the input, whereby the DC input voltage reference determines a desired dimming level of the lamp and the AC lamp current feedback signal maintains the lamp brightness at the desired dimming level. The DC input voltage reference is provided by one or both of a setting circuit comprising forward-biased diodes and/or an override circuit comprising transistors that are switched on to apply a maximum DC voltage.

11 Claims, 5 Drawing Sheets

THREE-WAY DIMMING BALLAST CIRCUIT

CROSS-REFERENCE TO RELATED APPLICATION

This application is based on and claims priority to U.S. Provisional Patent Application Ser. No. 60/927,104, filed on May 1, 2007 and titled THREE WAY DIMMING BALLAST CIRCUIT, the entire contents of which are hereby incorporated by reference.

BACKGROUND

The present disclosure relates to an improved three-way dimming ballast circuit for a gas discharge lamp such as a compact fluorescent lamp (CFL) ballast which is adapted to be used with a conventional three-way dimming Edison screw base.

FIG. 1A shows the well-known Edison screw base for an incandescent bulb having a single light output level. FIG. 1B shows a modification, a three-way dimming Edison base, which was developed for the known three-way incandescent bulb, having two contacts for two different filaments, and a common neutral contact. By the operation of a three-way dimming switch, as illustrated in FIG. 2, the two different filaments, having different power ratings, can be selectively operated separately or together to produce three different lumen outputs, with different corresponding power usage. The three-way dimming switch has four different positions, which provide three different light levels and an off selection.

The conventional dimming lamp base and dimming circuit of FIGS. 1B and 2 have been adapted for use with the energy-efficient compact fluorescent lamp (CFL).

U.S. Pat. No. 7,109,665, incorporated by reference, discloses a three-way dimming CFL ballast that operates at a single high bus voltage, while varying the switching frequency to control lamp current. The ballast accepts three different light level input switch command conditions and an off condition to provide three different light output levels. A closed loop current feedback control maintains a precise switching frequency for the ballast to produce accurate light output levels based on the selected light output switch selection. A reference voltage is provided to the feedback loop based on the selected light output level to drive the switching frequency at the appropriate value. The ballast circuit provides CFL control for three-way dimming and is adapted to be used with the three-way dimming Edison screw base illustrated in FIG. 1B and the switching circuit illustrated in FIG. 2, with a pair of live inputs 51 and 52 being connected to the two live outputs of the dimming switch via the contacts Live1 and Live2 on the lamp base.

SUMMARY

The disclosed circuits provide improvements over the circuit described in U.S. Pat. No. 7,109,665, including the following:

1. The ballast is designed around the IRS2530D "Simple Dim" Control IC, which contains closed loop regulating circuitry internally, thus substantially simplifying and reducing the cost of the external circuitry provided herein to realize three-way dimming control. The structure and operation of the IRS2530D are described in U.S. application Ser. No. 11/551,435, filed Oct. 20, 2006, titled DIMMING BALLAST CONTROL CIRCUIT (docket no. IR-3087), the disclosure of which is incorporated herein in its entirety.

2. The ballast described here provides for the independent programming of three distinct light levels, wherein an adjustment of one level does not affect the settings of the other levels.

3. The ballast described here also includes an override circuit, which forces the output to maximum and overrides the dimming control when the selected light output is switched to maximum.

Other features and advantages will become apparent from the following description, with reference to the accompanying drawings.

DETAILED DESCRIPTION OF EMBODIMENTS

Referring first to Ser. No. 11/551,435, the IRS2530D control IC incorporates a simple but effective dimming control loop that allows the peak lamp arc current to be regulated. The current is sensed by a series current sensing resistor shown as RCS in FIG. 4 of that application, providing a proportional feedback voltage to a DIM pin. This alternating feedback voltage is added to a DC dimming control voltage, received at DIM INPUT 20, that is fed to the DIM pin via RDIM1 such that after lamp preheat and ignition in dim mode as described therein, see the state diagram of FIG. 3, the voltage at the DIM input of the IRS2530D will consist of the alternating lamp feedback voltage with a DC offset added by the dimming control voltage. The circuitry within the IRS2530D regulates the negative going peak of this signal against 0V by adjusting the VCO pin voltage and thus modulates the ballast output frequency, which feeds the lamp through a resonant output circuit that reduces the lamp current as the frequency is increased. Therefore it is possible to dim the lamp by adjusting the DC control voltage applied to the RDIM1 resistor. This scheme is capable of producing stable dimming down to levels less than 10% of the rated lamp arc current.

Figure 1B:
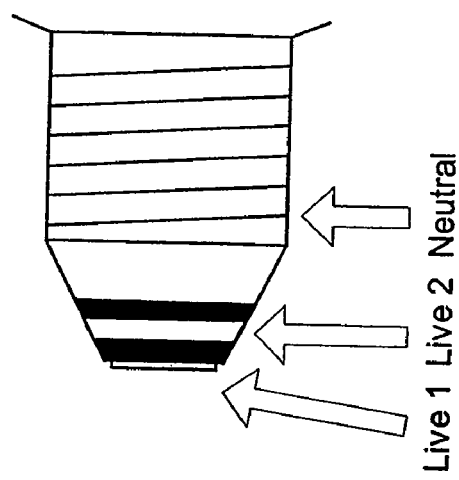
FIGS. 1A and 1B show respectively a standard Edison screw base and a three-way dimming Edison screw base.
Figure 1A:
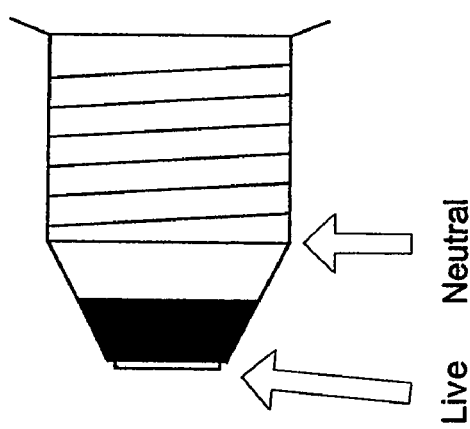
Figure 2:
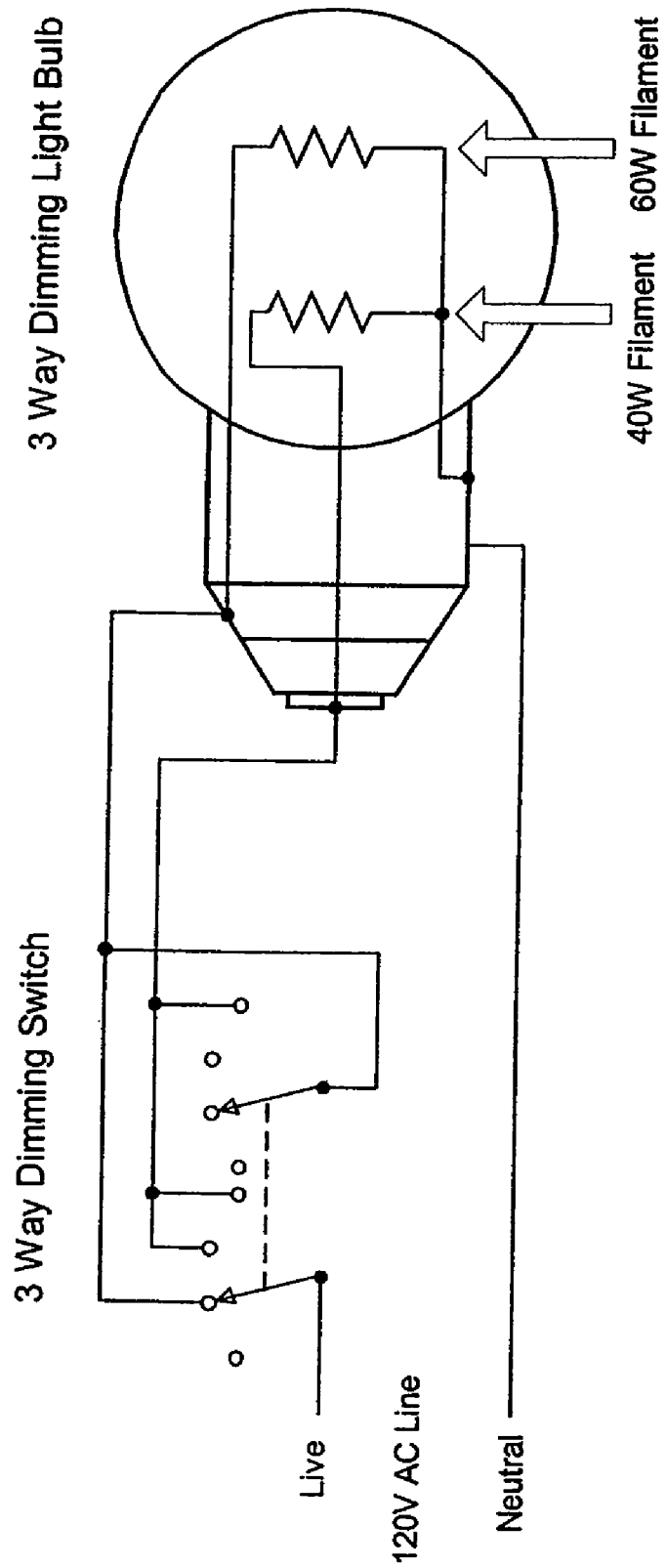
FIG. 2 is a schematic diagram of a known three-way switching circuit.
Figure 3:
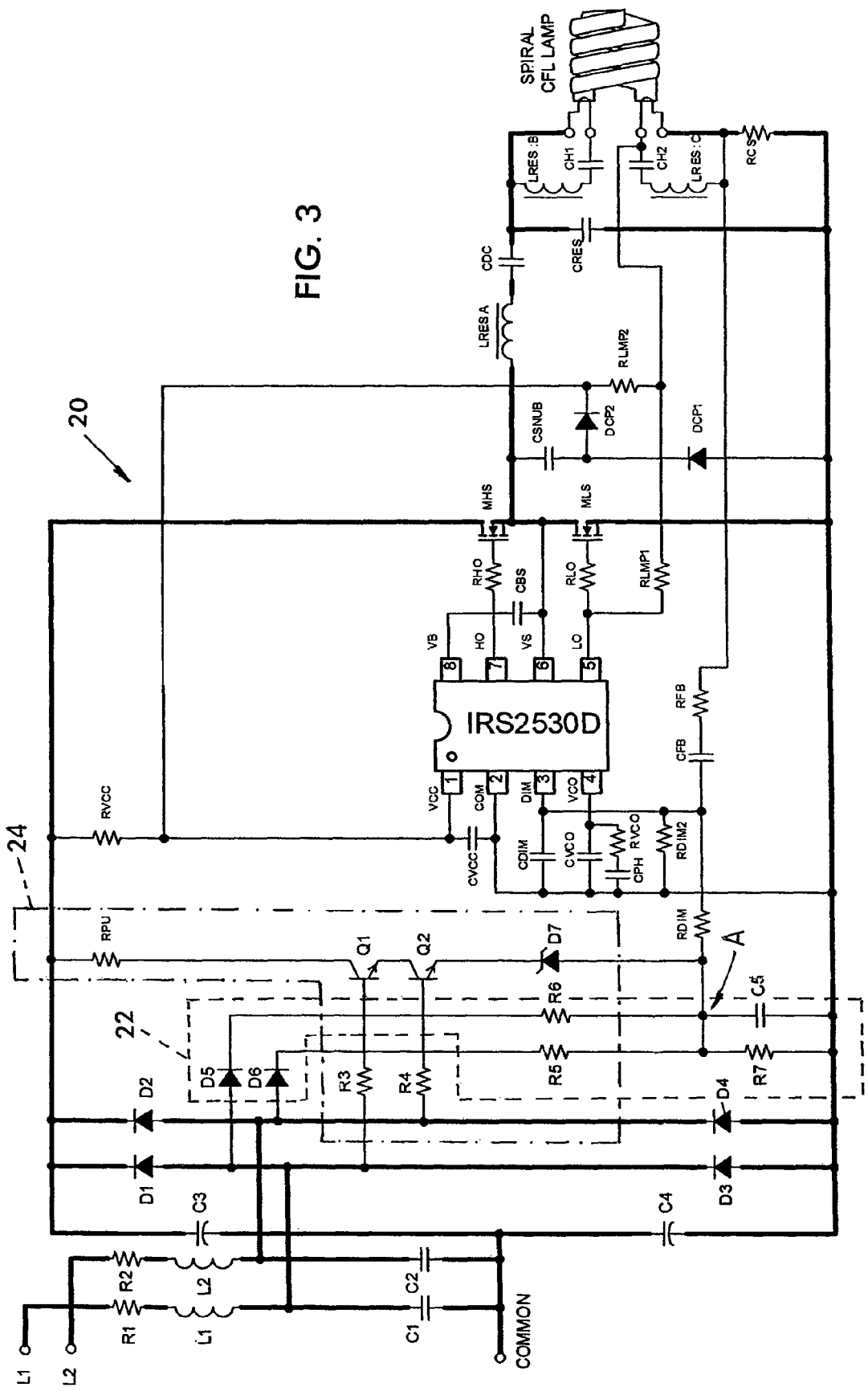
FIG. 3 is a circuit diagram illustrating a first embodiment.
Figure 4:
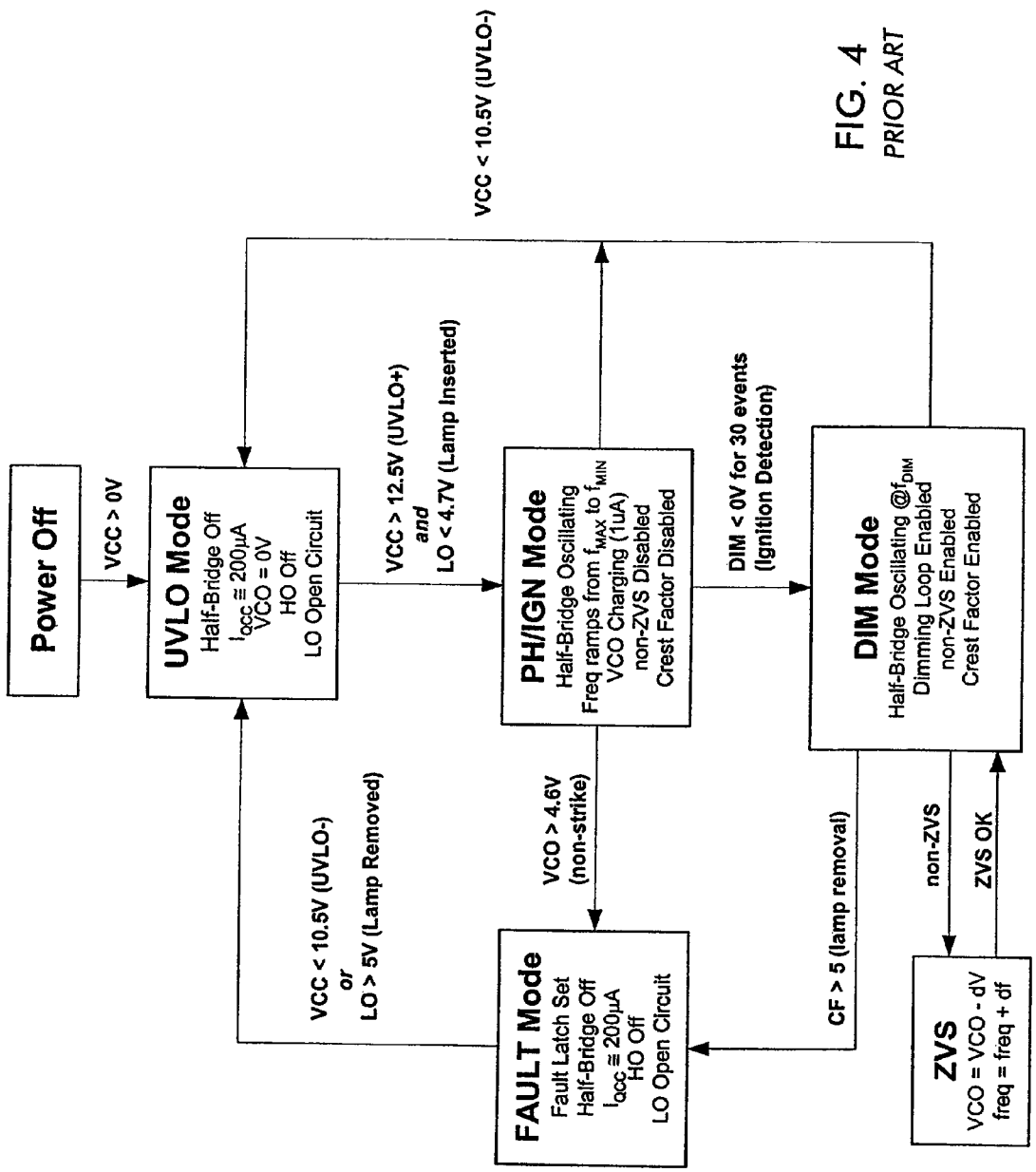
FIG. 4 is a state diagram describing the operation of the IRS2530D dimming ballast control IC.

Referring now to FIG. 3 of the present application, the ballast circuit designated generally as 20 has a setting circuit 22 that provides three different voltage levels (off, minimum and medium) at a point A at the junction of RDIM and C5. When either one or the other of the AC line inputs (L1 and L2), but not both, is connected, then a half-wave rectified voltage appears at the anode of one but not both of D5 and D6. Each of these diodes feeds a voltage divider (R5/R7 or R6/R7 respectively) that provides a smoothed DC voltage at point A (C5). R5 and R6 are set at different values to give different voltages at C5 depending on whether the L1 or the L2 input is connected to the AC line. These two voltages, respectively, program the minimum and medium light levels for the three-way dimming operation of the ballast. These two voltages can be set totally independently of each other allowing the designer to select the minimum and medium dim settings by adjusting just the two resistor values R5 and R6, without the difficulty of having to tune several other component values around the circuit.

The maximum light level is actuated by an override circuit 24. When both of the L1 and L2 inputs are connected to the line input then a pair of small signal transistors Q1 and Q2 will both be switched on, allowing current to flow through the zener diode D7 into RDIM. The presence of D7 provides that no current can flow through Q1 and Q2 if only one of the inputs L1 and L2 is connected to the line.

Q1 and Q2 have high voltage blocking capability to prevent leakage of current from collector to emitter when no base current is flowing. Preferably VCEO may be 300V.

Some residual voltage may be present on either C1 or C2 even if the corresponding input is not connected to the line input. The provision of the zener diode D7 in the circuit provides that this residual voltage will not be sufficient to switch on the corresponding transistor. Therefore, when both L1 and L2 are connected to the line input, current is permitted to pass through D7. The value of D7 is preferably at least 68V.

Thus, when Q1 and Q2 are both switched on, then current will flow through D7 and pull up the voltage at RDIM and C5 (point A) to a level that will cause the IRS2530D to drive the lamp at maximum output. The voltage at the DIM pin in this condition can be determined by selecting the value of the pull-up resistor RPU, which is arranged in series with Q1 and Q2. If this voltage is too high the IRS2530D ignition detection will not be able operate and the IC will shut down shortly after ignition.

Figure 5:
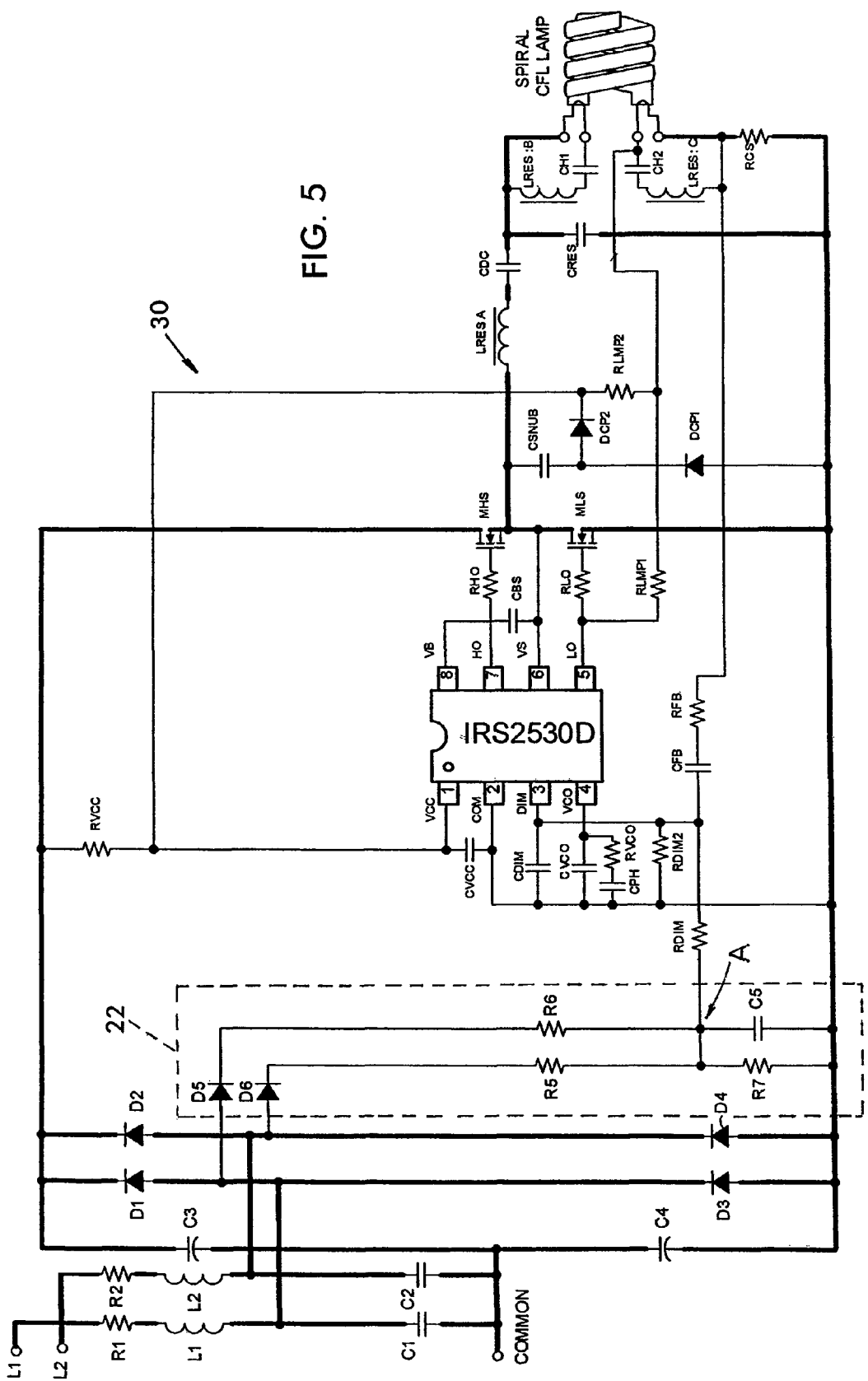
FIG. 5 is a circuit diagram illustrating a second embodiment.

Referring now to the simplified circuit 30 shown in FIG. 5, the override additional circuit 24 for setting the maximum level has been removed. In this case the maximum dimming level is provided by the setting circuit 22 as discussed above. In this case the level at point A will be the sum of the minimum and medium levels as programmed by the values of the resistors R5 and R6. This sum is expected to be sufficiently high in many cases with suitable ballast designs and lamps, particularly where the designer has not set R5 or R6 to large values in order to produce a very low level for the minimum light output.

Although the present invention has been described in relation to particular embodiments thereof, many other variations and modifications and other uses will become apparent to those skilled in the art. Therefore, the present invention is not limited by the specific disclosure herein.

What is claimed is:

1. A dimming ballast control circuit for driving a ballast power switching circuit powering a
   gas discharge lamp comprising:
   first and second AC line inputs;
   a driver circuit powered from said AC line inputs for driving high and low side switches of the ballast power switching circuit;
   a control circuit powered from said AC line inputs for driving the driver circuit including an oscillator circuit for providing an oscillating signal to control the frequency of operation of the ballast power switching circuit, the ballast power switching circuit outputting lamp powering pulsed signals; and
   a dimming control circuit having a dimming input, the dimming control circuit receiving an AC lamp current feedback signal at the dimming input, the dimming control circuit further receiving a DC input voltage reference at the dimming input whereby the DC input voltage reference determines a desired dimming level of the lamp and the AC lamp current feedback signal maintains the lamp brightness at the desired dimming level;
   the dimming control circuit further comprising a resistive divider stage coupled to said dimming input to provide said DC input voltage reference, said resistive divider stage comprising:
   a first diode having its anode connected to said first AC line input and its cathode connected to one end of a first resistor, and
   a second diode with its anode connected to said second AC line input and its cathode connected to one end of a second resistor,
   other ends of said first and second resistors being connected at a common node to one end of a third resistor, the other end of the third resistor being connected to a common point of said driver and control circuits; and
   said common node being connected to said dimming input for supplying said DC input voltage reference,
   whereby when the first AC line input is connected to AC power, the series connection of the first diode, first resistor and third resistor provides a first DC voltage level at said common node and to said dimming input for powering said gas discharge lamp at a first light level; and
   when the second AC line input is connected to AC power, the series connection of the second diode, second resistor and third resistor provides a second DC voltage level at said common node and to said dimming input for powering said gas discharge lamp at a second light level.

2. The circuit of claim 1, wherein said second DC voltage level is higher than said first DC voltage level for thereby powering said gas discharge lamp at a medium light level and a low light level, respectively.

3. The circuit of claim 1, wherein when both said first and second AC line inputs are connected to AC power, the resistive divider stage provides a third DC voltage level at said common node and to said dimming input for powering said gas discharge lamp at a third light level.

4. The circuit of claim 3, wherein said third DC voltage level is higher than either one of said first and second DC voltage levels for thereby powering said gas discharge lamp at a higher light level than said first and second light levels.

5. The circuit of claim 1, further comprising an override circuit comprising
   a series connection of a pull-up resistor receiving, at a first end thereof, AC power from said first and second AC line inputs, a second end of said pull-up resistor connected to a pair of transistors having main electrodes connected in series, and control electrodes connected respectively to said first and second AC line inputs, and said transistor main electrodes connected to one end of a zener diode, the other end of the zener diode being connected to said common node,
   whereby when both of said first and second AC line inputs are connected to AC power, said transistors conduct and provide a third voltage level at said common node and to said dimming control input for thereby powering said gas discharge lamp at a third light level.

6. The circuit of claim 5, wherein said third voltage level is higher than said first and second voltage levels, such that said third light level is higher than either of said first and second light levels.

7. The circuit of claim 1, further comprising a lamp base for supporting said gas discharge lamp and said driver, control, and dimming control circuits, wherein said first and second AC line inputs are connected to respective electrically insulated live electrodes on said lamp base.

8. The circuit of claim 1, wherein said AC lamp current signal is superimposed on said DC input voltage reference at the input to provide a time varying signal having a DC level.

9. The circuit of claim 1, further comprising:
a feedback capacitor for coupling a voltage proportional to current through the lamp to said input;
whereby an AC voltage proportional to the lamp current is superimposed on said DC input voltage reference that sets the desired dimming level.

10. The circuit of claim 9, wherein the feedback capacitor is coupled to receive the AC voltage proportional to the lamp current developed across a sensing resistor disposed in series with the lamp.

11. The circuit of claim 1, wherein the driver circuit, oscillator circuit and dimming control circuit are contained in an integrated circuit package, and said input is a single pin of said integrated circuit package, whereby said single pin functions as an input to receive said DC input voltage to set the desired dimming level of the lamp and receives said AC lamp current feedback signal to maintain said lamp at the desired dimming level determined by said DC input voltage.

* * * * *